(No Model.)  W. E. CURTIS.  2 Sheets—Sheet 1.
DEVICE FOR REGULATING TREATMENT OF SUBSTANCES CHRONOMETRICALLY, &c.
No. 557,192.  Patented Mar. 31, 1896.
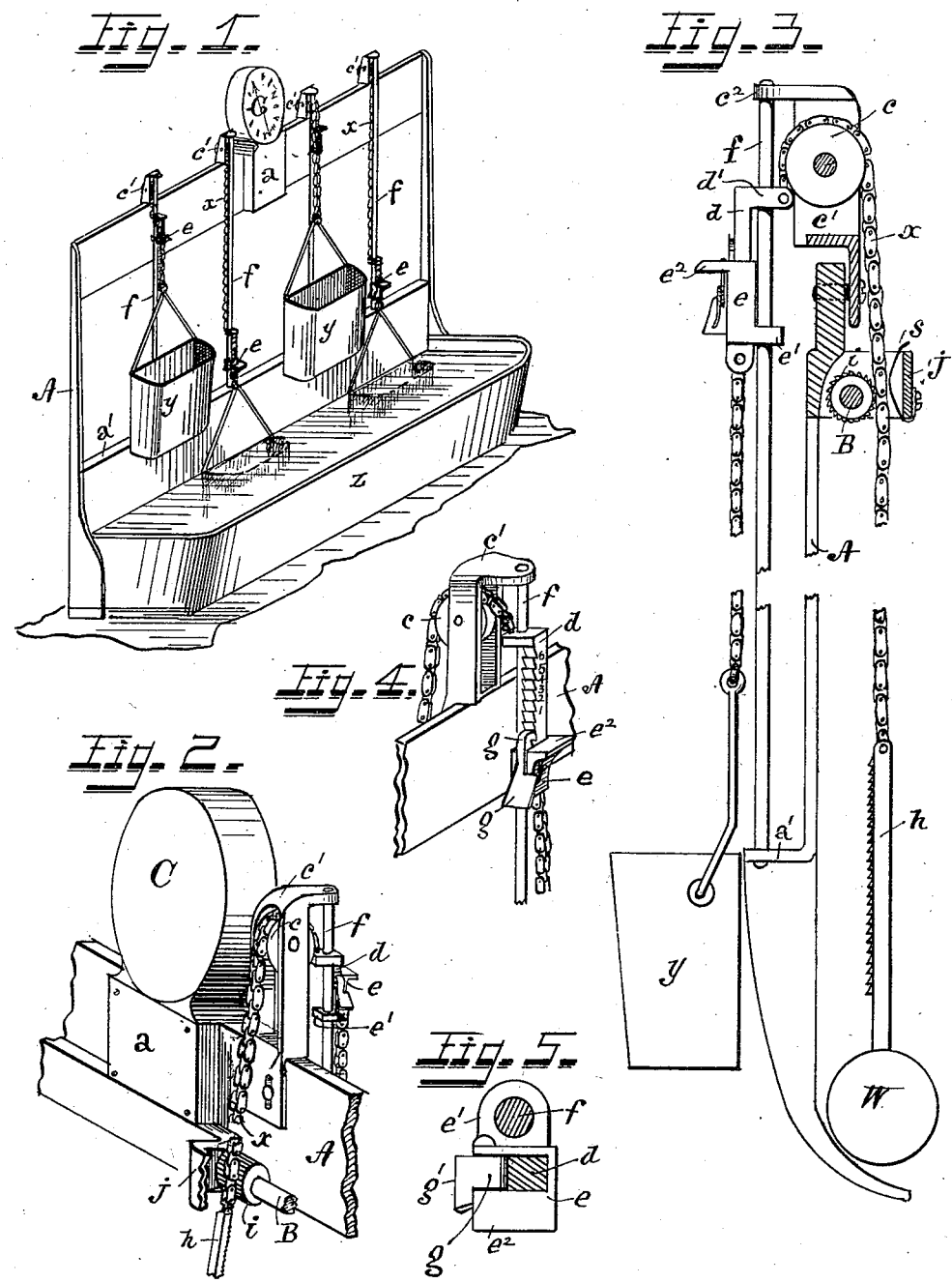

(No Model.) 2 Sheets—Sheet 2.
W. E. CURTIS.
DEVICE FOR REGULATING TREATMENT OF SUBSTANCES CHRONOMETRICALLY, &c.
No. 557,192. Patented Mar. 31, 1896.
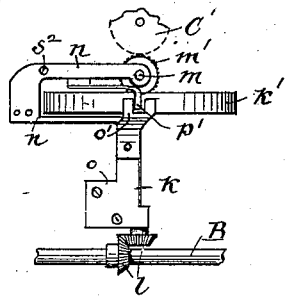
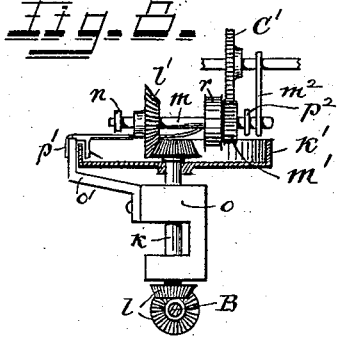
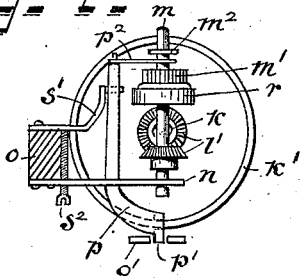
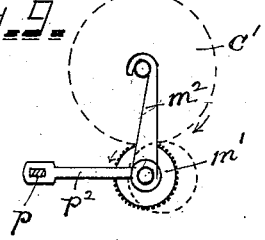
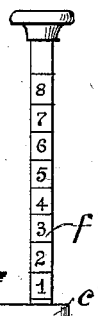
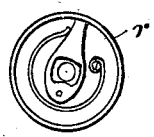

UNITED STATES PATENT OFFICE.

WILL ESPY CURTIS, OF CINCINNATI, OHIO.

DEVICE FOR REGULATING TREATMENT OF SUBSTANCES CHRONOMETRICALLY, &c.

SPECIFICATION forming part of Letters Patent No. 557,192, dated March 31, 1896.

Application filed September 24, 1894. Renewed March 4, 1896. Serial No. 581,812. (No model.)

*To all whom it may concern:*

Be it known that I, WILL ESPY CURTIS, a citizen of the United States, residing at Cincinnati, Ohio, have invented new and useful Improvements in Devices for Regulating the Treatment of Substances Chronometrically, &c., of which the following is a specification.

My invention relates to a device for automatically regulating the length of time during which an object or substance is subjected to treatment—such, for example, as exposure to heat, chemical solutions or vapors, &c.—its object being to provide an apparatus and mechanism by which, for example, an object or substance being immersed, for instance, in a heated liquid is at an appointed time withdrawn from the same without further attention on the part of the operator.

It consists also in an extension of the constructive principle involved to an apparatus adapted to receive and care for in like manner any number of objects or substances with certainty of action and entire independence each of the other.

The applications of the invention in the arts are quite numerous and important—for example, the immersion of textile and other fabrics in dyeing solutions, subjection of products to chemical action of vapors or liquid solutions, treatment of food products, such as eggs, fruit, and starchy substances, by boiling water, printing of photographs from negatives, and various other cases where the time of immersion or treatment or the beginning or termination of a given condition is important to be observed.

In the present illustrations of my invention I have selected its application to culinary purposes, and exhibit in the drawings an apparatus designed for use as an adjunct to a water-boiler to regulate the time of immersion of eggs, fruit, oatmeal, &c., for the use of hotels, hospitals, restaurants, private dwellings, &c.

A typical illustration of my invention is illustrated in the accompanying drawings, exhibiting a culinary apparatus for hotel use.

In the drawings, Figure 1 is a front or face perspective view of an apparatus intended for the use named, exhibiting four independent submersion-vessels adapted to be engaged with a common shaft, each being independent of the other, but controlled by the same mechanical appliances; Fig. 2, a partial rear perspective view showing certain details of the same; Fig. 3, a vertical cross-section exhibiting one of the lifting devices, on an enlarged scale, showing constructive features in detail; Fig. 4, a front perspective view of the setting device; Fig. 5, a plan view of same sectioned through the scale-bar; Fig. 6, a detail elevation of the shaft-regulating mechanism, showing its relation to the mechanism of a clock or other device for regulating its movement; Fig. 7, a plan view, and Fig. 8, a second elevation, partly sectioned, of the last-mentioned mechanism, exhibiting and illustrating the functions of the friction-brake. Fig. 9 is a detail of the mode of suspending the oscillating shaft. Fig. 11 is a detail showing the clutch mechanism for preventing a backward rotation of the operating-shaft from injuring the regulating devices, also intended to permit the operation of the clock independently of the use of the apparatus; and Fig. 10 exhibits a modification of structure.

It may facilitate an understanding of my invention to state at the outset that the mechanism employed is of simple character, that shown in the present instance embodying a shaft in rotation at a time-regulated speed and any desired number of sustaining and lifting devices independently attachable thereto in such manner that when the shaft has made a given number of revolutions or given increments of one revolution the lifting device will be released therefrom and permitted to act normally by independent means, such as weight, spring, or retractile force of any kind, employed for this purpose. This constructive principle, it will be obvious, is capable of any extension and may be applied to movement in any desired direction.

Referring now to the drawings, and to the apparatus illustrated therein, showing provisions for four sustaining and lifting devices connected to the same shaft, A designates a frame of any suitable construction, presenting, substantially, a support of vertical and longitudinal extension, capable of attachment to a suitable boiler $z$ to extend above the same at one side. Centrally at the top the frame A is enlarged into a box-shaped cavity $a$, through or below which, in both directions, extends a horizontal shaft B in or parallel with the horizontal general extension of the frame A and held in suitable bearings thereon.

A clock C of ordinary construction is shown mounted on the frame A immediately above the box-cavity $a$, and in the present case is utilized as a regulating device for permitting a constant and chronometric rotation of the shaft B; but any form of motor capable of chronometric regulation or a simple escapement or other device permitting a time-regulated rotation of the shaft B may be employed in lieu of the clock C.

Upon the top of the frame A are arranged in any desired distance relations four sheaves $c$, carried in supporting-brackets $c'$, attached to the frame. These constitute parts of the suspending and lifting devices, which are identical, and therefore the description of one will suffice for all.

Over the sheave $c$ is arranged a chain or cord $x$ of any suitable description, suspending at one end a vessel $y$ or holder of any kind containing the substance to be immersed and at the other an overbalancing-weight W, (or in lieu of an overbalancing-weight the end of the chain or cord may be wound upon a retracting-reel actuated by a spring.)

At the front side of the frame A the chain or cord $x$ is provided with an adjustable stop of any suitable character to engage against a fixed projection and limit the downward pull upon the chain $x$ to determine the extent of engagement of the chain at the rear side of the frame A with the shaft B.

The limiting-stop $e$, as shown in the present drawings, is arranged upon a scale-bar $d$, to which the chain $x$ is connected at the front side of the frame A, and is provided with a rear projecting loop $e'$, embracing, as a guide, a vertical bar $f$, which is connected above to the overhanging top $c^2$ of the bracket $c'$ and seated below in horizontal ledge $a'$ of the frame A. The scale-bar $d$, upon which the stop $e$ is adjustable, has a rear projection $d'$, forming a similar guide connection with the bar $f$, and is provided with notches spaced apart and numbered as desired—in the present case to represent half-minute intervals (as will more clearly appear later)—of which the alternate notches, indicating even minutes, are numbered on the front face, as shown in Fig. 4.

The stop $e$ is a block of metal recessed from top to bottom at one side to admit the scale-bar $d$, over which it slides, as indicated in Figs. 4 and 5, and projecting in front, as at $e^2$, into a finger-rest for convenient manipulation. In the recess of the block adjacent to the scale-bar is pivoted a catch $g$, extending below into a ledge $g'$ for manipulation in convenient relation with the finger-rest $e^2$; by which the stop may be released from the scale-bar and moved up or down on the same and upon the guide-bar $f$ and reëngaged at any point. The catch $g$ being engaged, the finger-rest $e^2$ is a means for depressing the chain or cord $x$ and lowering the vessel until the rear ledge $e'$ strikes the horizontal ledge $a'$ of the frame A.

At the opposite end of the chain or cord $x$ is suspended a fine-toothed rack-bar $h$, carrying the weight W. The cord or chain passes down at the rear of the frame A outside of and adjacent to the shaft B, at which point upon the shaft is a rack-pinion $i$, toothed to correspond with the rack-bar $h$. As a guide to the chain and rack-bar $h$ there is formed or attached to the frame A, opposite the gear $i$, a guide-loop $j$, through which the chain is passed. As this part of the chain is drawn up (by depressing the stop $e$, as before described, at the opposite side of the frame A) the rack-bar $h$ is drawn into the guide-loop $j$, and as its teeth point downward and those of the ratchet-wheel $i$ upward the rack-bar readily passes in an upward direction past the wheel; but in passing downward its teeth engage those of the ratchet-wheel, being held in engagement by a resilient spring $s$, secured in the guide-loop and bearing against the back of the rack-bar.

The parts are so proportioned that the extent to which the rack-bar $h$ is drawn up into engagement with the ratchet-wheel $i$ is determined with accuracy by the adjusted position of the stop $e$.

It will readily be perceived that the overweight W, when engaged with the shaft B by means of its rack-bar $h$, becomes a motor for causing its rotation, and, indeed, no other means are required, the function of the clock or any other motor device employed being merely to regulate such rotation chronometrically.

The regulating connection of the shaft B with the clock mechanism is illustrated in Figs. 6, 7, 8, 9, and 11, and consists of a short intervening vertical shaft $k$, having a miter-gear connection $l$ with the shaft B and a similar gear connection $l'$ with a short horizontal oscillating shaft $m$, engaged by means of a spur-gear $m'$ with one of the gears C' of the clock C, in this instance the "third wheel."

The vertical shaft $k$ is carried in a fixed bracket $o$, attached to the frame A, extended at one side into an arm $n$, carrying one end of the oscillating shaft $m$ in a loose bearing. The opposite end of the oscillating shaft $m$ is suspended by a swinging link $m^2$, Figs. 8 and 9, from the pintle of the third wheel C'. As the function of the clock in this connection is that of a retarding device, and as the rotative tendency of the shaft B is in the same direction as that of the clock connection, the retarding action of the clock tends to cause the gear $m'$ to travel backward upon the periphery of the gear C', and thus, by means of the link $p^2$, draw the free end of the lever $p$ to the right, as viewed in Figs. 7 and 9, and operates as follows: At the upper end of the vertical shaft $k$ is attached a cupshaped wheel $k'$, and above the same is placed a bell-crank lever $p$ with a bifurcated end $p'$ turned downward astraddle of the outer flange of the cup $k'$, Figs. 6, 7, and 8. The free end of the bell-crank lever $p$ is attached by a link $p^2$ to the corresponding suspended end of the shaft $m$, and an adjustable stop-arm $s'$, attached to the bracket $o$, extends under it as a support. The lever $p$ is supported at its bifurcated end upon an extension-bracket $o'$, recessed to admit and retain the end of the lever against displacement. Any travel of the gear $m'$ upon the third wheel $C'$ in the direction indicated carries the free end of the lever and turns the bifurcated end askew upon the flange of the cup-wheel, where it acts as a clamp and arrests its motion. There is thus formed an exceedingly sensitive brake. An undue backward motion of the lever is limited by the stop $s'$ as an abutment, whose position is regulated by an adjustment-screw $s^2$ bearing against it. The brake acts to check rotation of the shaft B, corresponding by the onward movement of the clock C.

The operation of the device as a whole is simple and has already been partially indicated. The attendant proceeds by first setting the stop $e$ at the figured notch corresponding with desired time of immersion, and then by downward pressure pulls down the chain at the front side of the machine and lowers the containing vessel into the boiling water. This action raises up the weight W correspondingly, and its rack $h$ engages a corresponding portion of its length upon the ratchet-wheel $i$ of the shaft B. The rotation of the latter gradually lowers the rack-bar $h$ until its last notch is engaged, and further rotation releases it entirely, when the dropping of the overweight W lifts the containing vessel clear of the water in the boiler.

In cases where a considerable excess of weight is employed to insure certainty of action, a brake device may be used with advantage to regulate the lifting action. In the present case the bucket $y$ is utilized for this purpose—as, when lifted full of water surrounding the confined objects, its weight so nearly approximates that of the overweight W as to retard the movement. Apertures at or near the bottom of the bucket permit the water to flow out as the vessel rises, and the rapidity of the movement thus increases.

The clutch device $r$ referred to (shown in Fig. 11) is interposed between the shaft B and the clock mechanism. In the present instance I have shown it placed at $r$, Figs. 7 and 8, constituting the means of attachment of the spur-gear $m'$ with the horizontal shaft $m$.

As a substitute for the adjustable stop $e$ and rack-bar $h$, I have shown by way of modification in Fig. 10 the guide-bar $f'$ made adjustable in guides vertically and connected to the chain in lieu of the stop device. The bar $f'$ has indicating cross-marks and time-figures at the upper end. It is operated by depressing the bar until the proper mark registers with the bracket projection $c'$, the rack-bar $h$ engaging correspondingly with the shaft B.

I claim as my invention and desire to secure by Letters Patent of the United States—

1. In an apparatus for regulating chronometrically the treatment of substances, the combination of an attachment or holder for an object to be moved or withdrawn; a moving or withdrawing device: a chronometrically-operated detent; and means for engaging the detent with the withdrawing device during a given period of its movement and releasing the same at the termination of such period; substantially as set forth.

2. The combination, with apparatus for the treatment of substance chronometrically, of mechanism for withdrawing the holder of the substance treated; a detent for restraining the movement of said mechanism; and a time mechanism connected with and adapted to move the detent; said withdrawing mechanism having means extending a portion of its length for engaging the detent; substantially as set forth.

3. In combination with a shaft or other moving element acting as a detent, a plurality of withdrawing devices, engaged therewith independently in desired relations so as to be released by the continued movement of the detaining element according to their relations of engagement; and means for automatically regulating the movement of the shaft or detaining element, substantially as set forth.

4. The combination of a cord or chain suspending at one end a substance to be treated, and at the other connected to a normally active retracting device, with a shaft in chronometric rotation, and means for engaging the cord or chain with the shaft during any desired number of increments of the shaft rotation and releasing it when said increments are completed, substantially as set forth.

5. The combination of an extended shaft constituting a detent and provided with means for its chronometric rotation; a series of cords or chains adjacent thereto, connected at one end to a substance to be treated, and at the other to a normally active retracting device; and means for connecting any or all of said cords or chains, independently and at will, to said shaft as a detent for any desired number of increments of the shaft rotation, and releasing the same when the said increments are completed; substantially as set forth.

6. The combination of a shaft provided with means for its chronometric rotation; a ratchet fixed thereon; a cord or chain adjacent to said ratchet and connected to a substance to be treated or object to be moved, and to a retracting device; and a rack-bar interposed in said cord or chain, adapted to be drawn for a predetermined distance into engagement with said ratchet to hold the cord or chain against the action of the retractile device, until, in the normal rotation of the shaft, the engagement of the rack-bar is exhausted and the cord or chain released, substantially as set forth.

7. The combination of a shaft provided with means for its chronometric rotation; a ratchet fixed thereon; a cord or chain adjacent to said ratchet at one side, and connected through a ratchet-bar to a retractile device, a rack-bar at the opposite terminus of the chain; an adjustable stop upon said rack-bar, and an independent extension of the cord or chain attached to the stop and connected to the object to be treated, substantially as set forth.

8. A device for the treatment of objects, as specified, comprising a frame adapted to be attached to a boiler or similar object; a clock or other chronometric regulating device; a shaft whose rotation is controlled thereby; a series of pulleys carried by the frame above the shaft; a series of cords or chains suspended by said pulleys and extending down at both sides of the supporting-frame, connected at one side to retractile devices, and having rack-bars adapted to engage to a greater or less extent with the ratchet-teeth upon the shaft; stops upon the cord or chain, adjustable in relation thereto, and vessels suspended therefrom for the reception of the objects to be treated; substantially as set forth.

9. In an apparatus of the character indicated, in combination with the clock or other chronometric regulating device, a shaft whose rotation is controlled thereby, and the suspending and lifting device adapted to be engaged therewith, and thereby connect its retractile device operatively with the clock or regulating mechanism; an automatic friction-brake interposed in the train of connecting mechanism, operating to resist undue stress of the retractile device upon the shaft-regulating mechanism, substantially as set forth.

In testimony whereof I have hereunto set my hand in the presence of two subscribing witnesses.

WILL ESPY CURTIS.

Witnesses:
   SANDOW FREYBLER,
   L. M. HOSEA.